United States Patent
Duan (10) Patent No.: US 7,789,363 B2
(45) Date of Patent: Sep. 7, 2010

(54) SUPPORT STAND FOR FLAT-PANEL DISPLAY MONITOR AND ELEVATING SUPPORT USED FOR SUPPORT STAND

(75) Inventor: Jun-Wu Duan, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 151 days.

(21) Appl. No.: 12/126,988

(22) Filed: May 26, 2008

(65) Prior Publication Data

US 2009/0146024 A1   Jun. 11, 2009

(30) Foreign Application Priority Data

Dec. 7, 2007   (CN) .................. 2007 1 0202937

(51) Int. Cl.
   *E04G 3/00*   (2006.01)
(52) U.S. Cl. ............... 248/284.1; 248/125.8; 248/158; 248/161; 248/123.11; 248/125.2; 248/917; 248/919; 248/920; 248/921; 248/922; 248/923; 248/280.11; 248/918; 248/924; 248/281.11; 248/371; 248/278.1; 248/276.1; 248/274.1; 361/679.21; 361/679.01
(58) Field of Classification Search ............ 248/125.8, 248/158, 161, 123.11, 125.2, 917–924, 280.11, 248/284.1, 281.11, 371, 278.1, 276.1, 274.1; 361/679.21, 679.01
See application file for complete search history.

(56) References Cited

U.S. PATENT DOCUMENTS 6,018,847 A * 2/2000 Lu .............................. 16/337
6,695,274 B1 * 2/2004 Chiu ......................... 248/371
6,912,120 B2 * 6/2005 Kim et al. .............. 361/679.06
7,061,753 B2 * 6/2006 Michoux et al. ....... 361/679.05
7,198,237 B2 * 4/2007 Cho et al. ................... 248/133
7,252,277 B2 * 8/2007 Sweere et al. ............... 248/371
7,431,254 B2 * 10/2008 Cheng ................... 248/292.12
7,444,716 B2 * 11/2008 Hsu ........................... 16/366
7,448,583 B2 * 11/2008 Kim et al. ................ 248/278.1
7,513,468 B2 * 4/2009 Jung et al. .................. 248/133
7,567,436 B2 * 7/2009 Jeong .................... 361/679.22
7,604,206 B2 * 10/2009 Jung et al. .................. 248/133
7,631,841 B1 * 12/2009 Yen et al. .................... 248/121
2004/0021051 A1 * 2/2004 Chiu ......................... 248/371
2006/0032998 A1 * 2/2006 Depay .................... 248/291.1

(Continued)

*Primary Examiner*—Anita M King
*Assistant Examiner*—Nkeisha J Smith
(74) *Attorney, Agent, or Firm*—Zhigang Ma (57) ABSTRACT

An exemplary support stand for a flat-panel display monitor, includes a monitor bracket, a rotatable bracket for fixing the monitor bracket, an elevating support, a support member, and a hinge assembly. The elevating support includes a first link bracket, a second link bracket, a plurality of supporting blocks for connecting end portions of the first link bracket and the second link bracket. One end portion of the first link bracket define a first restricting groove and one end portion of the second link bracket defining a second restricting groove corresponding to the first restricting groove. One of the supporting blocks includes a restricting pole. The first and second restricting grooves are configured for blocking the restricting pole. A first end of the elevating support is fixed to the support member; and a second end of the elevating support connects to the rotatable bracket by the hinge assembly.

14 Claims, 5 Drawing Sheets

U.S. PATENT DOCUMENTS

| | | | |
|---|---|---|---|
| 2008/0192417 A1* | 8/2008 | Hwang et al. | 361/681 |
| 2008/0302926 A1* | 12/2008 | Cheng et al. | 248/161 |
| 2010/0079932 A1* | 4/2010 | Zhou | 361/679.01 |
| 2010/0084522 A1* | 4/2010 | Zhou et al. | 248/124.1 |
| 2010/0096518 A1* | 4/2010 | Wang et al. | 248/125.7 |
| 2010/0108829 A1* | 5/2010 | Zhou | 248/125.1 |
| 2010/0123053 A1* | 5/2010 | Wang | 248/125.1 |
| 2010/0123054 A1* | 5/2010 | Yuan et al. | 248/125.7 |

* cited by examiner

SUPPORT STAND FOR FLAT-PANEL DISPLAY MONITOR AND ELEVATING SUPPORT USED FOR SUPPORT STAND

BACKGROUND OF THE INVENTION

1. Field of the Invention

The present invention generally relates to support stands, particularly, to a support stand for a flat-panel display monitor.

2. Discussion of the Related Art

LCDs or flat-panel display monitors offer advantages, over cathode ray tubes (CRTs) such as a greatly reduced size, and better image quality. Furthermore, because of the small weight of the LCD or flat-panel display, the viewing angle and the height of the monitor can be adjusted without moving the base of the monitor stand.

A typical support stand generally includes a monitor bracket for attaching to the flat-panel display monitor, a rotatable bracket for fixing the monitor bracket, an elevating support, a support member, and a base member for mounting the support member. The rotatable bracket is rotatably hinged to an end of the elevating support by a first hinge assembly. The support member is hinged to another end of the elevating support by a second hinge assembly. The elevating support includes a pair of first supporting washers, a pair of second supporting washers, a pair of front link shafts, a pair of back link shafts, and a supporting board. An end of each front link shaft is attached to an end of one of the first supporting washers and an end of each back link shaft is attached to another end of the same one of the first supporting washers. Another end of each front link shaft is attached to an end of each the second supporting washers and another end of each back link shaft is attached to another end of the same one of the second supporting washer. The supporting board includes two sidewalls. Each side wall includes a first end portion and a second portion. The first supporting washers are attached to the first end portions of sidewalls of the supporting board by pivotal shafts of the first hinge correspondingly, and the second supporting washers are attached to the second end portions of sidewalls of the supporting board by pivotal shafts of the second hinge correspondingly. One of the second end portions of the supporting board defines a curved retaining groove. The support member includes an inner side portion and a retaining piece formed at the inner side portion corresponding to the curved retaining groove.

A viewing angle of the flat-panel display monitor mounted on the typical support stand can be adjusted by rotating the rotatable bracket relative to the elevating support. A height of the flat-panel display monitor can be adjusted by rotating the elevating support relative to the support member. The retaining piece of the support member engaging in the curved retaining groove of the link bracket is configured for restricting an adjusting range of the height of the flat-panel display monitor. However, the retaining piece is easily abraded or damaged by an exterior force. As a result, the flat-panel display monitor may not remain stable at the height selected by a user. Therefore, the typical support stand has a relatively short usage life.

Therefore, a new support stand for a flat-panel display monitor is desired in order to overcome the above-described shortcomings.

SUMMARY

In one aspect, a support stand for a flat-panel display monitor, includes a monitor bracket, a rotatable bracket for fixing the monitor bracket, an elevating support, a support member, and a hinge assembly. The elevating support includes a first link bracket, a second link bracket, a plurality of supporting blocks for connecting end portions of the first link bracket and the second link bracket. One end portion of the first link bracket define a first restricting groove and one end portion of the second link bracket defining a second restricting groove corresponding to the first restricting groove. One of the supporting blocks includes a restricting pole. The first and second restricting grooves are configured for blocking the restricting pole so that the elevating support is adjusted between a first utmost position and a second utmost position. A first end of the elevating support is fixed to the support member and a second end of the elevating support opposite to the first end connects to the rotatable bracket by the hinge assembly.

In another aspect, an elevating support, used for a support stand of a flat-panel display monitor, includes a first link bracket, a second link bracket, a plurality of supporting blocks for connecting end portions of the first link bracket and the second link bracket. The first link bracket includes end portions, and one of the end portions defines a first restricting groove. The second link bracket includes end portions, and one end portion of the second link bracket defines a second restricting groove corresponding to the first restricting groove. One of the supporting blocks includes a restricting pole, the first and second restricting grooves are configured for blocking the restricting pole so that the elevating support is adjusted between a first utmost position and a second utmost position.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the present support stand for a flat-panel display monitor. Moreover, in the drawings, like reference numerals designate corresponding parts throughout the several views.

DETAILED DESCRIPTION OF THE EMBODIMENTS

Reference will now be made to the drawings to describe preferred embodiments of the present support stand and the elevating support in detail.

Figure 1:
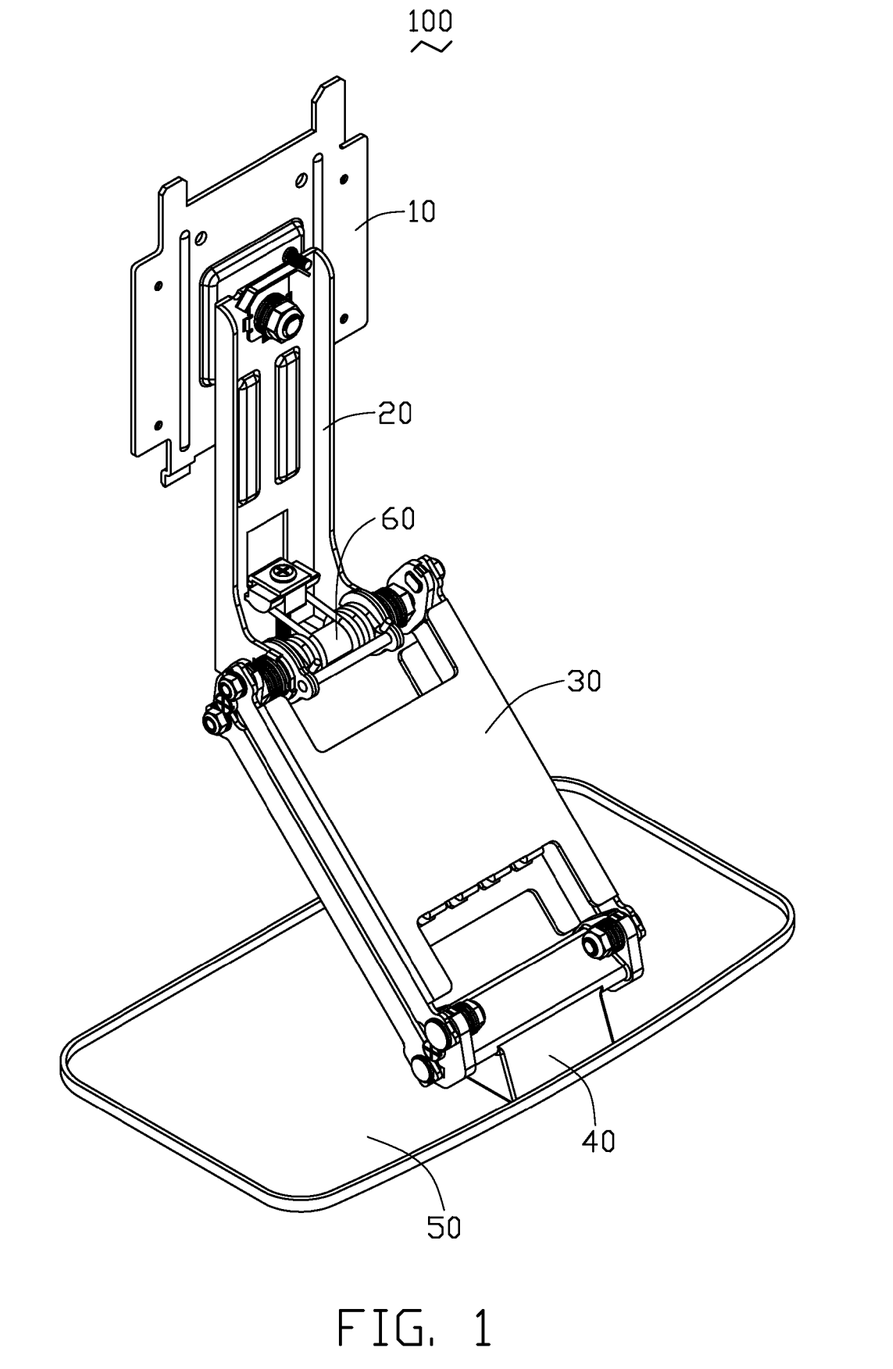
FIG. 1 is an assembled, isometric view of a support stand for a flat-panel display monitor in accordance with an exemplary embodiment of the present invention.

Referring to the drawings in detail, FIG. 1 shows a support stand 100 for a flat-panel display monitor in accordance with an exemplary embodiment of the present invention. The support stand 100 includes a monitor bracket 10 for holding the flat-panel display monitor, a rotatable bracket 20 for fixing the monitor bracket 10, an elevating support 30, a support member 40, a base member 50 for mounting the support member 40, and a hinge assembly 60. An end of the elevating support 30 is fixed to the support member 40 and another end of the elevating support 30 opposite to the support member 40 is rotatable attached to the rotatable bracket 20 by the hinge assembly 60.

Figure 2:
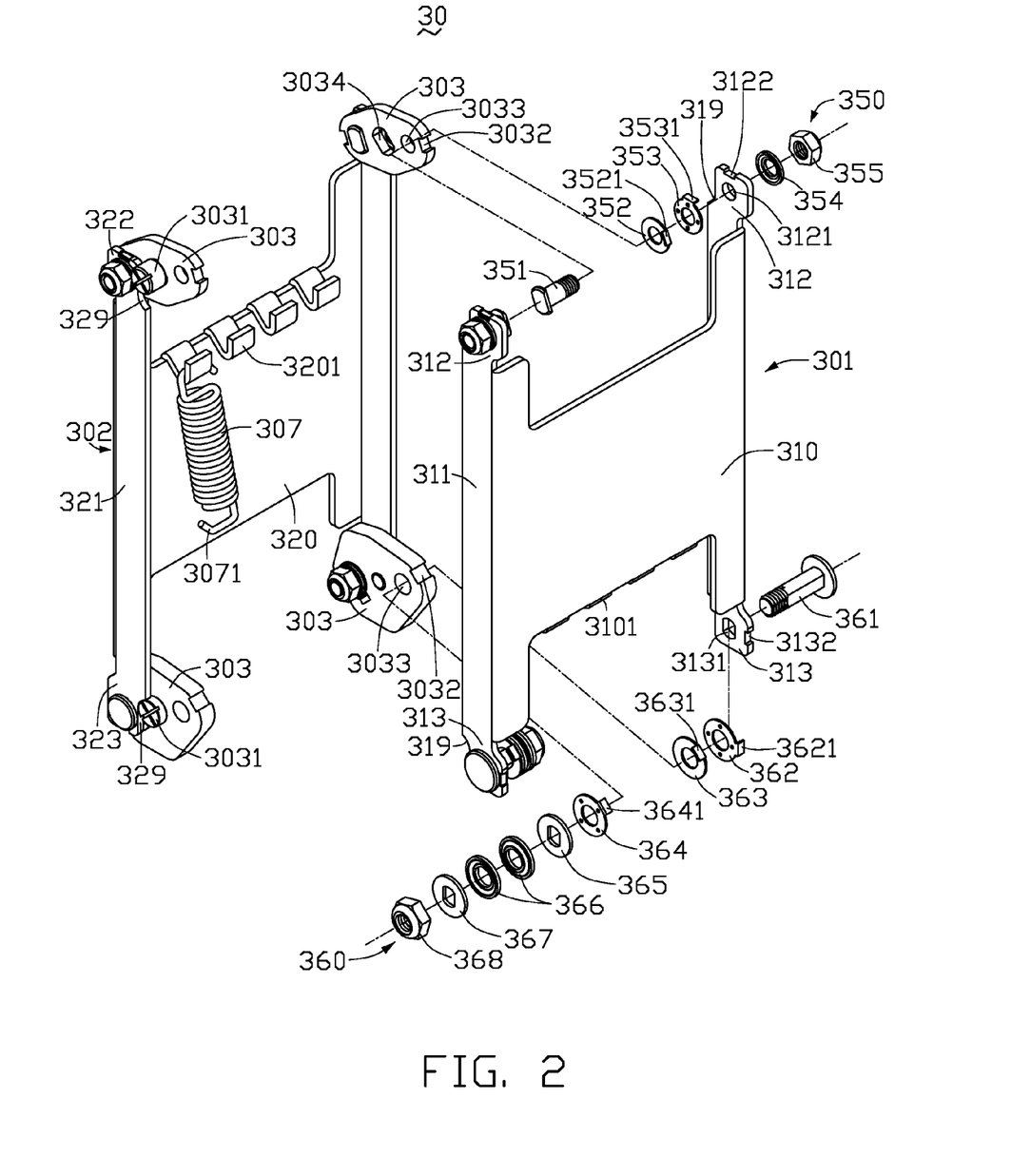
FIG. 2 is an exploded, isometric view of an elevating support of the support stand of FIG. 1.

Referring to FIG. 2, the elevating support 30 includes a first link bracket 301, a second link bracket 302, four supporting blocks 303 (a first supporting block, a second supporting block, a third supporting block, and a fourth supporting block), a first pivot mechanism 350, a second pivot mechanism 360, and a tension spring 307. The first link bracket 301 is substantially H-shaped. The first link bracket 301 includes a link sheet 310 and two side walls 311 extending from opposite sides of the link sheet 310 correspondingly. The link sheet 310 includes at least one latching hook 3101 formed at a bottom end. Each of the side walls 311 includes a first end portion 312 and a second end portion 313 formed at two ends. The first end portion 312 defines a first pivot hole 3121 in a middle and a fixing groove 3122 in an edge. The first pivot hole 3121 is a circular hole. The second end portion 313 defines a second pivoting hole 3131 in a middle and a fixing groove 3132 in an edge. The second pivot hole 3131 is a non-circular hole. The second link bracket 302 is similar in principle to the first link bracket 301. The second link bracket 302 is also substantially H-shaped and includes a link sheet 320. The link sheet 320 includes at least one latching hook 3201 formed at a top end. The second link bracket 302 also includes two side walls 321 extending from opposite longer sides of the link sheet 320 correspondingly and each of the side walls 321 includes a first end portion 322 defining a first pivot hole (not shown) and a second end portion 323 defining a second pivot hole (not shown).

Each of the supporting blocks 303 defines two pivot holes 3033 adjacent to two end portions, a fixing hole 3034 in a middle portion. Each end portion of the supporting blocks 303 defines a fixing groove 3032 in an edge.

The first pivot mechanism 350 includes a pivot shaft 351, two tab washers 352, 353, a resilient ring 354, and a fixing member 355. Each of the tab washers 352, 353 defines a circular hole (not labeled) in a middle. The tab washers 352, 353 are circular and further defines a plurality of oil holes (not labeled) adjacent to the circular hole. The oil holes are configured for storing lubricating oil. A tab 3521 is formed at a periphery of the tab washer 352 and a tab 3531 is formed at a periphery of the tab washer 353. The resilient ring 354 is configured to sleeve on the pivot shaft 351 and a middle portion of the resilient ring 354 protrudes toward a side. The resilient ring 354 is configured for providing an axial force. The fixing member 355 is a hexagonal nut corresponding to the pivot shaft 351.

The second pivot mechanism 360 includes a pivot shaft 361, and three tab washers 362, 363, 364, two washers 365, 367, a pair of resilient rings 366, and a fixing member 368. A cross-section taken perpendicular to a central axis of the pivot shaft 361 corresponds to a shape of the second pivoting hole 3131 of the second end portion 313 of the second link bracket 302. The tab washers 362, 363, 364 are similar in principle to the tab washers 352, 353. Each of the tab washers 362, 363, 364 includes a tab 3621, 3631, 3641 formed at a periphery of the tab washers 362, 363, 364, respectively. Each of the washers 365, 367 defines a non-circular hole (not labeled) in a middle. The resilient rings 366 are configured to sleeve on the pivot shaft 361. A middle portion of each resilient ring 366 protrudes toward one side. The fixing member 368 is a hexagonal nut.

The tension spring 307 includes two hooks 3071 extending from opposite end portions of the tension spring 307.

To assemble the elevating support 30, one hook 3071 of the tension spring 307 is fixed to the latching hook 3101 of the first link bracket 301 and the other hook 3071 is fixed to the latching hook 3201 of the second link bracket 302. The pivot shaft 351 passes through one of the pivot holes 3033 of a first supporting block 303, the tab washers 352, 353, the first pivot hole 3121 of the first end portion 312 of the first link bracket 301, the resilient ring 354, and the fixing member 355 in that order. The fixing member 355 is latched on the pivotal shaft 351. The tab 3521 of the tab washer 352 is received in the fixing groove 3032 of a first supporting block 303. The tab 3531 of the tab washer 353 is received in the fixing groove 3122 of the first end portion 312 of the first link bracket 301. Accordingly, the first end portion 312 of a side of the first link bracket 301 is assembled to an end of the first supporting block 303 by the pivot mechanism 350. Similarly, the first end portion 313 of a side of the second link bracket 302 is assembled to another end of the first supporting block 303 opposite to the pivot mechanism 350.

The pivot shaft 361 passes through the second pivot hole 3131 of the second end portion 313 of the first link bracket 301, the tab washers 362, 363, one of the pivot holes 3033 of a second supporting block 303, the tab washer 364, the washer 365, the pair of resilient rings 366, the washer 367, and the fixing member 368 in that order. The fixing member 368 is latched at the pivotal shaft 361. The tab 3621 of the tab washer 362 is received in the fixing groove 3132 of the second end portion 313 of the first link bracket 301. The tab 3631 of the tab washer 363 and the tab 3641 of the tab washer 364 are received in the fixing groove 3032 of a second supporting block 303. Hence, the second end portion 312 of a side of the first link bracket 301 is assembled an end of the second supporting block 30 by the pivot mechanism 360. Similarly, the second end portion 313 of a side of the second link bracket 302 is assembled another end of the second supporting block 303 opposite to the pivot mechanism 360. The first and second end portions 312, 313 of another side of the first and second link brackets 301, 302 are respectively assembled to the third and four supporting blocks 303.

It should be emphasized that, each of the first and second end portions 312, 313 of the first link bracket 301 further defines a restricting groove 319, and each of the first and second end portions 322, 323 of the second link bracket 302 also defines a restricting groove 329. Each of the supporting blocks 303 includes a restricting pole 3031 fixed to the fixing hole 3034 in the middle portion. The restricting pole 3031 is substantially cylindrical and defines a cross groove in an end portion. Each of the restricting grooves 319, 329 includes a bend surface (not labeled) for engaging with the restricting pole 3031, thereby restricting a tilting range of the elevating support 30.

It should be pointed that, the restricting grooves 319 may be defined in at least one of the first and second end portions 312, 313 of the first link bracket 301, and the restricting grooves 329 may be defined in at least one of the first and second end portions 322, 323 of the second link bracket 302. Correspondingly, at least one of the supporting blocks 303 includes a restricting pole 3031 fixed to the fixing hole 3034 in the middle portion for engaging with the restricting grooves 319, 329, thereby restricting the tilting range of the elevating support 30.

Figure 3:
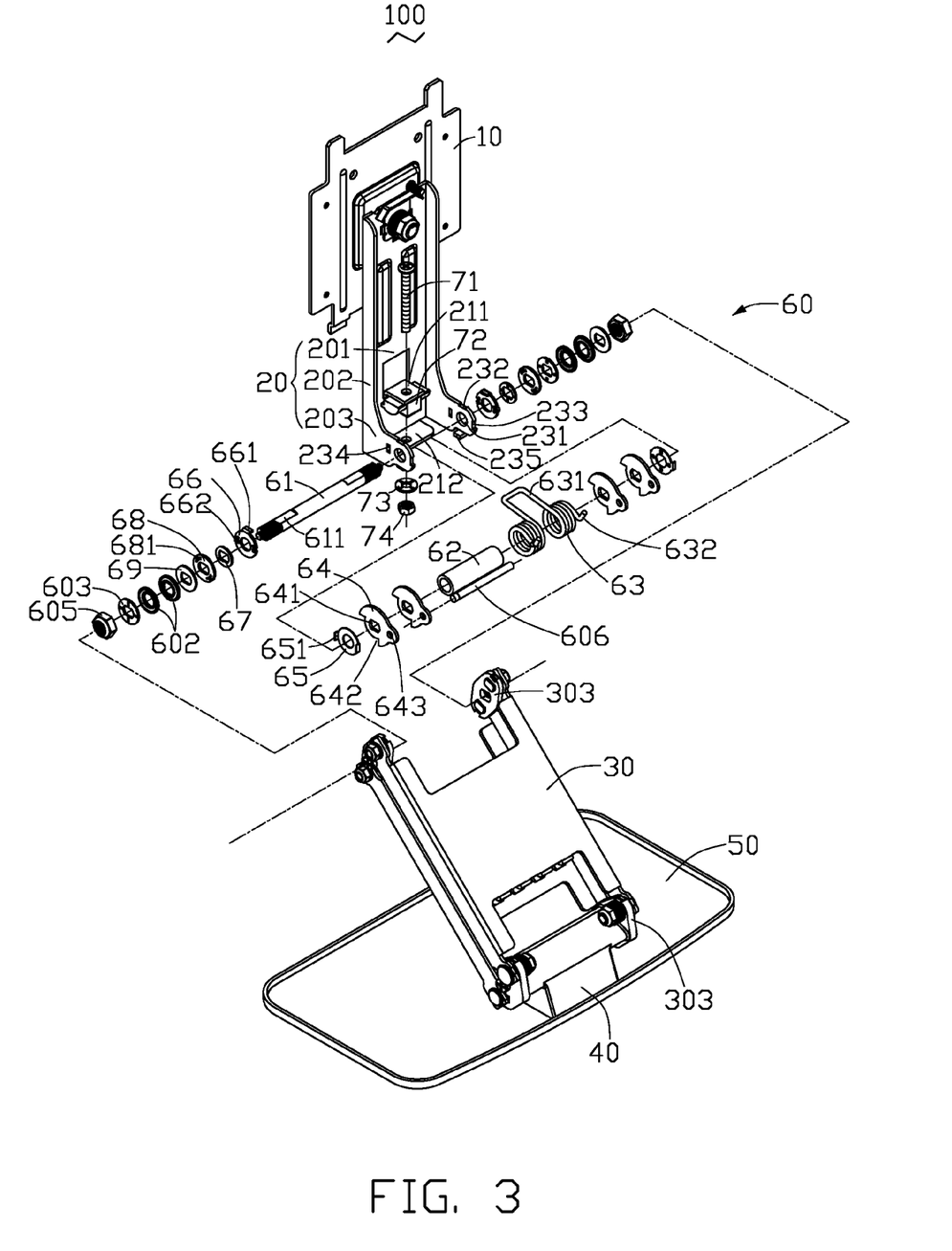
FIG. 3 is a partially exploded, isometric view of the support stand of FIG. 1.

Referring to FIG. 3, the rotatable bracket 20 includes a mounting board 201, two side walls 202 extending from opposite sides of the mounting board 201. Each of the side walls 202 includes a support portion 203 formed at a lower end. The mounting board 201 includes a top portion for fixing the monitor bracket 10, a first extending portion 211 formed in a middle portion, and a second extending portion 212 formed in a lower portion. Each of the first extending portion 211 and the second extending portion 212 defines a circular hole (not labeled). The support portion 203 defines a pivot hole 231 in a middle, two fixing grooves 232, 233 in an edge (not labeled), and a fixing hole 234 adjacent to the pivot hole 231. The support portion 203 also includes a restricting block 235 extending from the edge.

The hinge assembly 60 includes a pivot shaft 61, a sleeve 62 sleeved on the pivot shaft 61, a torsion spring 63 sleeved on the sleeve 62, two limiting washers 64, a first tab washer 65, a second tab washer 66, a protecting washer 67, a pressing washer 68, a washer 69, a pair of resilient rings 602, a protecting washer 603, a nut 605, and a pin 606. The limiting washers 64, a first tab washer 65, a second tab washer 66, a protecting washer 67, a pressing washer 68, a washer 69, a pair of resilient rings 602, a protecting washer 603, and a nut 605 are all configured to be sleeved on the pivot shaft 61 in that order.

The pivot shaft 61 is substantially cylindrical, and includes two shaft portions 611 at opposite ends. The shaft portion 611 defines a thread (not labeled) on a distal end portion. The shaft portion 611 is non-circular. In this embodiment, a cross section taken perpendicular to a central axis of the shaft portion 611 is D-shaped, thereby forming a flat surface. Thus, the thread is discontinuous.

The torsion spring 63 includes two torsion portions (not labeled), an n-shaped connecting portion 631 for connecting the torsion portions. Each of the torsion portions of the torsion spring 63 includes a latching end 632.

Each of the limiting washers 64 defines a deformed hole 641 in a middle. The shape and size of the deformed hole 641 corresponds a cross-section of the shaft portion 611. Each of the limiting washers 64 defines a restricting groove 642 at a periphery and defines a pin hole 643 adjacent to the deformed hole 64.

The first tab washer 65 is substantially ringed-shaped, and defines a round hole (not labeled) in a middle and a plurality of oil holes (not labeled) adjacent to the round hole. Two tabs 651 are formed at a periphery of the first tab washer 65. The tabs 651 are configured for correspondingly engaging with the fixing groove 233 and the fixing hole 234 of the support portion 203 of the rotatable bracket 20 such that the first tab washer 65 is non-rotatable relative to the rotational base 20.

The second tab washer 66 is substantially ringed-shaped, and defines a round hole (not labeled) in a middle. The second tab washer 66 includes a tab 661 formed at a periphery of second tab washer 66 and two extending portions 662 formed adjacent to the periphery.

The protecting washer 67 is substantially ringed-shaped, and defines a round hole (not labeled) in a middle and a plurality of oil holes (not labeled) adjacent to the round hole.

The pressing washer 68 is substantially ringed-shaped, and defines a deformed hole (not labeled) in a middle and includes two extending portions 681 formed adjacent to the periphery.

The washer 69 defines a deformed hole (not labeled) in a middle and a plurality of oil holes (not labeled) adjacent to the deformed hole.

Each of resilient rings 602 defines a round hole (not labeled) in a middle.

The protecting washer 603 is the same as the protecting washer 67.

The pin 606 is cylindrical, and are configured for passing through the pin holes 643 of the limiting washers 64.

The support stand 100 further includes a screw 71, a mounting block 72, a washer 73, and a nut 74. The screw 71 defines a cross groove (not labeled) in an end portion. The mounting block 72 is fixed below the first extending portion 211 of the rotational base 20. The washer 73 is substantially ringed-shaped, and defines a round hole (not labeled) in a middle and a plurality of oil holes (not labeled) adjacent to the round hole.

To assemble the support stand 100, the torsion spring 63 is sleeved on the sleeve 62. The sleeve 62 with the torsion spring 63, the limiting washers 64, the first tab washer 65 are disposed between the two support portions 203 of the rotatable bracket 20. The pin 606 passes through the pin holes 643 of the limiting washers 64. The connecting portion 631 of the torsion spring 63 is sleeved on the mounting block 72. The screw 71 extends through the first extending portion 211 of the rotational base 20, the second extending portion 211 of the rotational base 20, the washer 73, and engages with the nut 74, thus preventing the torsion spring 63 from falling off the rotational base 20. The two latching ends 632 abut an upper portion of the pin 606. The tabs 651 of the first tab washer 65 engages, correspondingly, with the fixing groove 233 and the fixing hole 234 of the support portion 203 of the rotatable bracket 20.

The pivot shaft 61 passes through the pivot hole 231 of one support portion 203 of the rotatable bracket 20, the first tab washer 65, the two limiting washers 64, the sleeve 62, the another two limiting washers 64, the another first tab washer 65, and the pivot hole 231 of another support portion 203 of the rotatable bracket 20. The second tab washer 66, the protecting washer 67, the pressing washer 68, the washer 69, the resilient rings 602, the protecting washer 603 are sleeved on the shaft portion 611 of the pivot shaft 61, and the nut 605 is fixed on the shaft portion 611 of the pivot shaft 61. The tab 661 of the second tab washer 66 is received in the fixing groove 232 of the support portion 203 of the rotatable bracket 20.

Two supporting blocks 303 disposed at an end of the elevating support 30 are correspondingly attached to the two shaft portions 611 of the pivot shaft 61, thus the elevating support 30 is rotatable relative to the rotatable bracket 20. Two supporting blocks 303 disposed at another end of the elevating support 30 are fixed to the support member 40.

When the support stand 100 are used for supporting a flat-panel display monitor, the monitor bracket 10 of the support stand is fixed to a display body (not shown) of the flat-panel display monitor. In use, a force is applied on the display body for rotating the display body with the rotatable bracket 20 along an axis of the pivot shaft 61 of the hinge assembly 60 relative to the elevating support 30, thereby adjusting the viewing angle of the flat-panel display monitor. The first and second tab washer 65, 66 are rotated with elevating support 30 relative to the pivot shaft 61 of the hinge assembly 60. The protecting washer 67, the pressing washer 68, the washer 69, the resilient rings 602, the protecting washer 603 are fixed relative to the pivot shaft 61 of the hinge assembly 60. The resilient rings 602 create an axial force. Thus the hinge assembly 60 provides an amount of friction that allows movement of the display body relative to the support stand 100 when a moderate force is applied, and that also allows the display body to be stably maintained in a desired position relative to the support body 100. The friction created by the hinge assembly 60 can be adjusted by the nut 605. The restricting block 235 of the support portion 203 and the restricting groove 642 of the limiting washers 64 cooperatively restrict the rotatable bracket 20 in limited adjusting range. A torsion force of the torsion spring 63 either increases or decreases according to the rotation of the rotatable bracket 20, thereby preventing an excessive force from damaging the hinge assembly 60.

Figure 4:
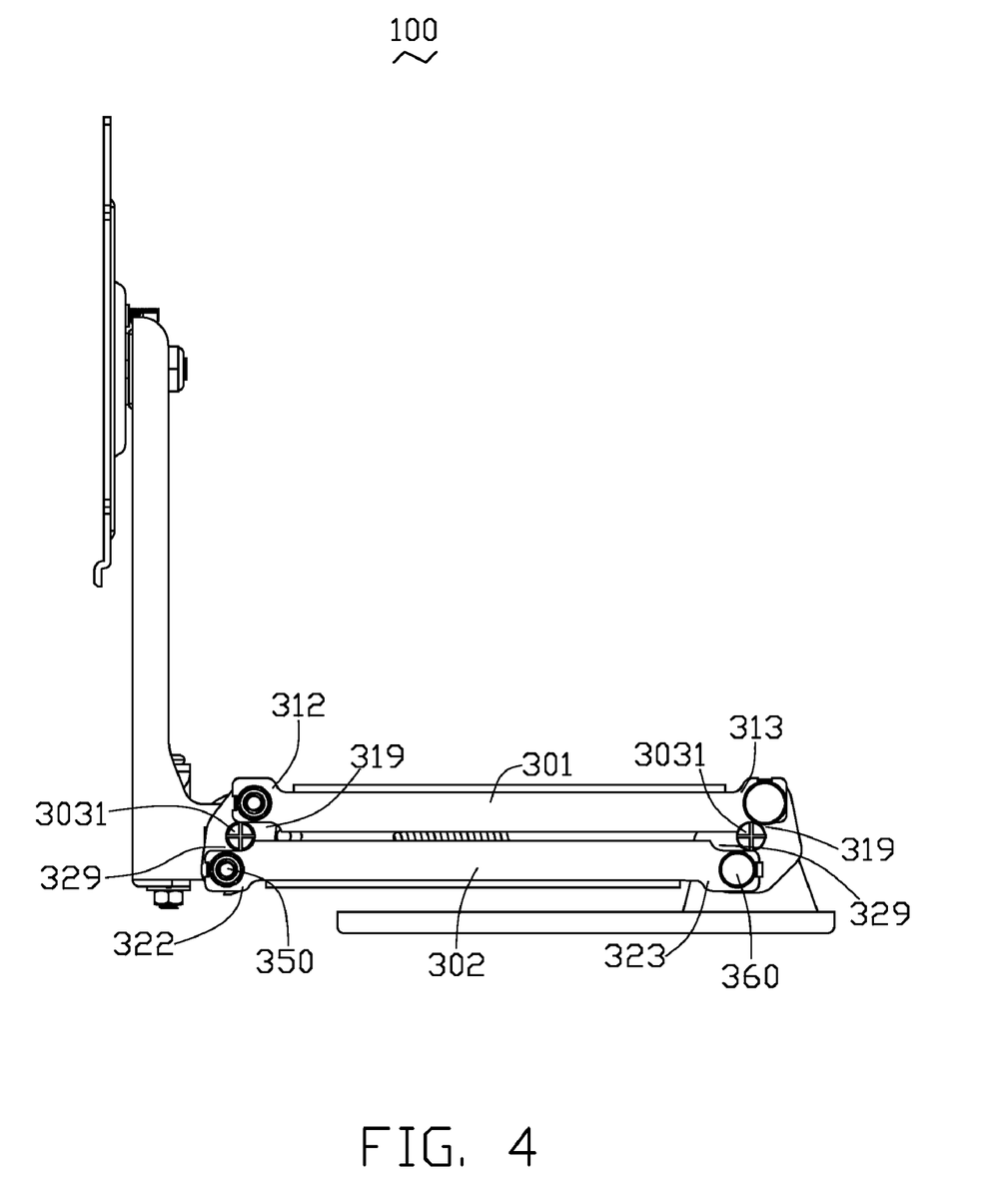
FIG. 4 is a side view of the support stand of FIG. 1, and showing the elevating support of the support stand rotated to a first utmost position (lowest position).

Referring to FIG. 4, the elevating support 30 is in a first utmost position (lowest position), the restricting poles 3031 abut the restricting grooves 319 of the second end portion 313 of the first link bracket 301 and the restricting grooves 329 of the first end portion 322 of the second link bracket 302 correspondingly, thereby restricting the rotatable bracket 20 together with the display body in a minimum height. When the height of the rotatable bracket 20 together with the display body needs to increase, the display body is pushed upwards so that the elevating support 30 is moved to increase the height of the display body. In the adjusting process, the height of the flat-panel display monitor is changed by the elevating support 30, but the viewing angle of the flat-panel display monitor is still not changed. When the flat-panel display monitor is lifted to a predetermined height, the flat-panel display monitor can be stably maintained at the predetermined height by friction created by the first and second pivot mechanisms 350, 360.

Figure 5:
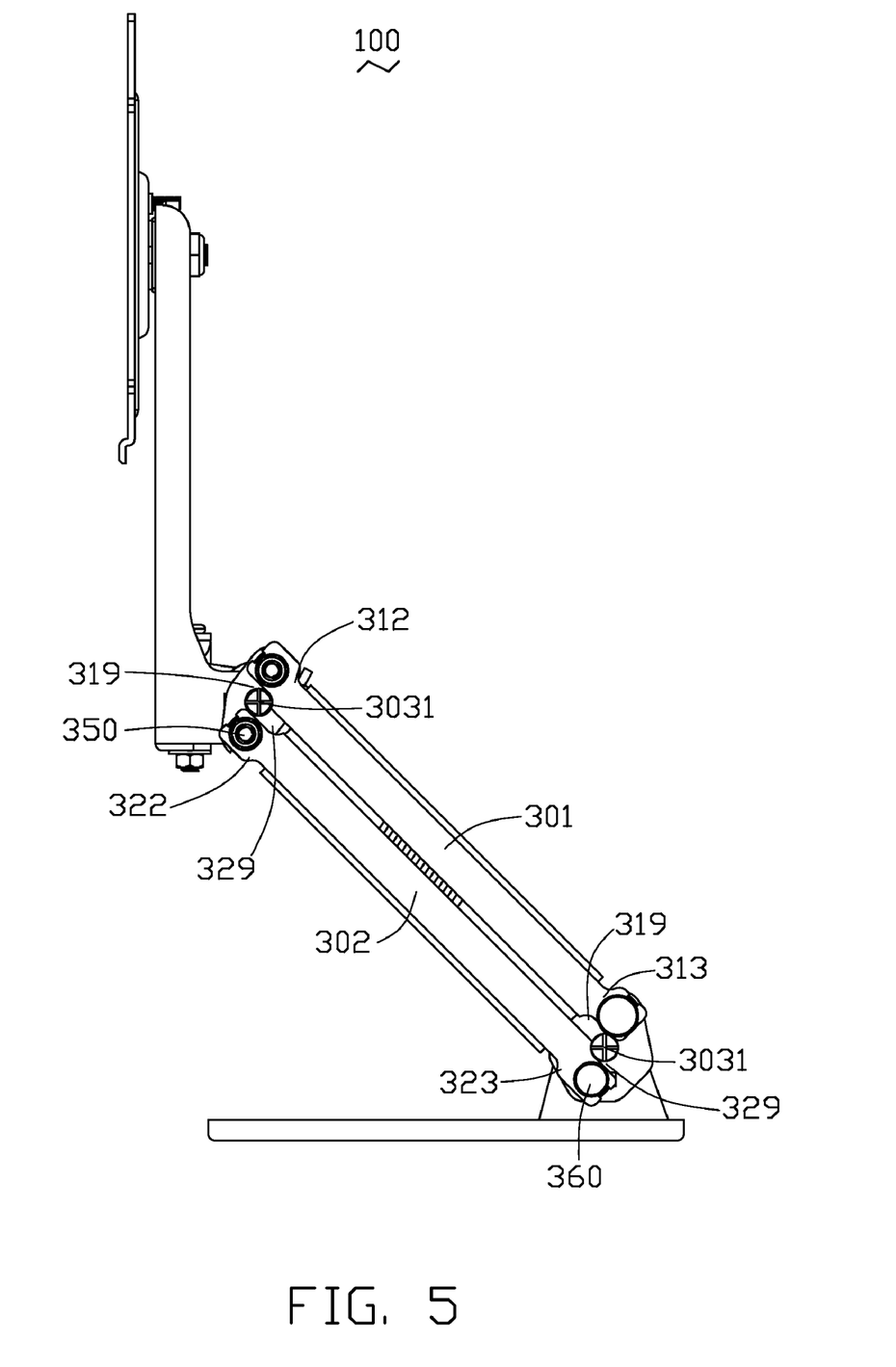
FIG. 5 is similar to FIG. 4, but showing the elevating support of the support stand rotated to a second utmost position (highest position).

Referring to FIG. 5, the elevating support 30 is in a second utmost position (highest position), the restricting poles 3031 abut the restricting grooves 319 of the first end portion 312 of the first link bracket 301 and the restricting grooves 329 of the second end portion 323 of the second link bracket 302 correspondingly, thereby restricting the rotatable bracket 20 together with the display body in a maximum height.

The restricting poles 3031 is strong enough, and is difficult to be abraded or damaged by an exterior force. In addition, a torsion force of the tension spring 307 either increases or decreases according to the motion of the elevating support 30, thereby further preventing an excessive force from damaging the elevating support 30. Therefore, the support stand 100 has a relatively long usage life. Further, the first and second utmost positions are restricted by the restricting poles 3031 engaging in the restricting grooves 319, 329, thus the elevating support 30 is effectively restricted between the first utmost position and the second utmost position. In other words, the display body can be adjusted between the minimum height and the maximum height.

It should be pointed that, the restricting poles 3031 are not limited to cylindrical shapes and can also be other shapes such as rectangular. In addition, the elevating support 30 can be used for adjusting heights of other applications. For example, the elevating support 30 may be applied in a freestanding, adjustable mirror.

It is believed that the present embodiments and their advantages will be understood from the foregoing description, and it will be apparent that various changes may be made thereto without departing from the spirit and scope of the invention or sacrificing all of its material advantages, the examples hereinbefore described merely being exemplary embodiments of the invention.

What is claimed is:

1. A support stand for a flat-panel display monitor, comprising:
    a monitor bracket;
    a rotatable bracket for fixing the monitor bracket, one end of the rotatable bracket defining a pivot hole therein and comprising a restricting block adjacent to the pivot hole;
    an elevating support, including a first link bracket, a second link bracket, a plurality of supporting blocks for connecting end portions of the first link bracket and the second link bracket, at least one end portion of the first link bracket defining a first restricting groove, and at least one end portion of the second link bracket defining a second restricting groove corresponding to the first restricting groove, and at least one of the supporting blocks including a restricting pole, the first and second restricting grooves configured for blocking the restricting pole so that the elevating support is adjusted between a first utmost position and a second utmost position;
    a support member, and a first end of the elevating support being fixed to the support member; and
    a hinge assembly for connecting a second end of the elevating support to the rotatable bracket opposite to the first end, wherein the hinge assembly comprises a pivot shaft rotatable extending through the pivot hole of the rotatable bracket, a pin and a limiting washer fixedly sleeved on the pivot shaft, the second end of the elevating support is fixed relative to the pivot shaft, the limiting washer defines a deformed hole in a middle for the pivot shaft passing through, a pin hole adjacent to the deformed hole for the pin passing through, and a restricting groove at a periphery for blocking the restricting block.

2. The support stand as claimed in claim 1, wherein the hinge assembly further comprises a torsion spring, the torsion spring having two torsion portions and an n-shaped connecting portion for connecting the two torsion portions; each of the torsion portions of the torsion spring comprises a latching end for abutting the pin, and the n-shaped connecting portion fixed to the rotatable bracket.

3. The support stand as claimed in claim 2, wherein the hinge assembly further comprises a plurality of washers, a pair of resilient rings, a nut sleeved on two shaft portions of the pivot shaft to provide friction for the rotatable bracket.

4. The support stand as claimed in claim 1, wherein each of the first and second link brackets is substantially H-shaped.

5. The support stand as claimed in claim 4, wherein each of the first and second link brackets comprises a link sheet and two side walls extending from two sides of the link sheet; each of the side walls comprises a first end portion and a second end portion formed at two ends thereof; each of the first end portions defines a first pivot hole in the middle and each of the second end portions defines a second pivoting hole defined in the middle; each of the supporting blocks defines two pivot holes adjacent to two end portions thereof, the elevating support further includes four first pivot mechanisms and four second pivot mechanisms, each of the pivot mechanism extends through one of the first pivot holes and one of the pivot holes of each supporting block, each of the second pivot mechanisms extends through one of the second pivot holes and one of the pivot holes of each supporting block.

6. The support stand as claimed in claim 5, wherein the link sheet of the first link bracket includes a latching hook formed at a bottom end thereof and the link sheet of the second link bracket includes a latching hook formed at a top end thereof, the elevating support further includes at least one tension spring having two hooks extending from opposite end portions thereof, one hook of the tension spring is fixed to the latching hook of the first link bracket and the other hook of the tension spring is fixed to the latching hook of the second link bracket.

7. The support stand as claimed in claim 5, wherein the first pivot mechanism comprises a pivot shaft, two tab washers, a resilient ring, and a fixing member, the pivot shaft passes through one of the pivot holes of each supporting block, the tab washers, the first pivot hole of the first end portion of the first link bracket, the resilient ring, and the fixing member in that order, and the fixing member is latched at the pivotal shaft.

8. The support stand as claimed in claim 5, wherein the second pivot mechanism comprises a pivot shaft, and three tab washers, two washers, a pair of resilient rings, and a fixing member, the pivot shaft passes through the second pivot hole of the second end portion of the first link bracket, two of the tab washers, one of the pivot holes of the supporting block, one of the tab washer, one of the washers, the pair of resilient rings, another one of the washer, and the fixing member in that order, and the fixing member is latched at the pivotal shaft.

9. The support stand as claimed in claim 1, wherein the restricting pole is substantially cylindrical, and each of the restricting grooves includes a bend surface for restricting the restricting pole.

10. An elevating support, used for a support stand of a flat-panel display monitor, the elevating support comprising:
a first link bracket including end portions, and at least one end portion defining a first restricting groove,
a second link bracket including end portions, and at least one end portion of the second link bracket defining a second restricting groove corresponding to the first restricting groove; and
a plurality of supporting blocks for connecting end portions of the first link bracket and the second link bracket, and at least one of the supporting blocks including a restricting pole, the first and second restricting grooves configured for blocking the restricting pole so that the elevating support is adjusted between a first utmost position and a second utmost position;
wherein each of the first and second link brackets comprises a link sheet and two side walls extending from two sides of the link sheet, each of the side walls comprises a first end portion and a second end portion formed at two ends thereof, each of the first end portions defines a first pivot hole in the middle and each of the second end portions defines a second pivoting hole in the middle, each of the supporting blocks defines two pivot holes adjacent to two end portions thereof; the elevating support further comprises four first pivot mechanisms and four second pivot mechanisms, each of the first pivot mechanism extends through one of the first pivot holes and one of the pivot holes of each supporting block, and each of the second pivot mechanisms extends through one of the second pivot holes and one of the pivot holes of each supporting block; each first pivot mechanism comprises a pivot shaft, two tab washers, a resilient ring, and a fixing member, the pivot shaft passes through one of the pivot holes of each supporting block, the tab washers, the first pivot hole of the first end portion of the first link bracket, the resilient ring, and the fixing member in that order, and the fixing member is latched at the pivotal shaft.

11. The elevating support as claimed in claim 10, wherein the first and second link brackets are substantially H-shaped.

12. The elevating support as claimed in claim 10, wherein the link sheet of the first link bracket comprises a latching hook formed at a bottom end thereof and the link sheet of the second link bracket includes a latching hook formed at a top end thereof, the elevating support further comprises at least one tension spring having two hooks extending from opposite end portions thereof, one hook of the tension spring is fixed to the latching hook of the first link bracket and the other hook of the tension spring is fixed to the latching hook of the second link bracket.

13. The elevating support as claimed in claim 10, wherein the second pivot mechanism comprises a pivot shaft, and three tab washers, two washers, a pair of resilient rings, and a fixing member; the pivot shaft passes through the second pivot hole of the second end portion of the first link bracket, two of the tab washers, one of the pivot holes of a the supporting block, one of the tab washer, one of the washers, the pair of resilient rings, another one of the washer, and the fixing member in that order; and the fixing member is latched at the pivotal shaft.

14. The elevating support as claimed in claim 10, wherein the restricting pole is substantially cylindrical, and each of the restricting grooves includes a bend surface for restricting the restricting pole.

\* \* \* \* \*